Sept. 16, 1952  C. G. SONTHEIMER  2,611,030
ENERGY TRANSFER SYSTEM
Filed Oct. 24, 1947  4 Sheets-Sheet 1

Fig. 1.

INVENTOR.
CARL G. SONTHEIMER.
BY Blair, Curtis & Hayward
ATTORNEYS.

Sept. 16, 1952 C. G. SONTHEIMER 2,611,030
ENERGY TRANSFER SYSTEM
Filed Oct. 24, 1947 4 Sheets-Sheet 2

INVENTOR.
CARL G. SONTHEIMER.
BY Blair, Curtis & Hayward
ATTORNEYS.

Sept. 16, 1952 C. G. SONTHEIMER 2,611,030
ENERGY TRANSFER SYSTEM
Filed Oct. 24, 1947 4 Sheets-Sheet 3

INVENTOR.
CARL G. SONTHEIMER.
BY Blair, Curtis & Hayward
ATTORNEYS.

Patented Sept. 16, 1952

2,611,030

UNITED STATES PATENT OFFICE 2,611,030

ENERGY TRANSFER SYSTEM

Carl G. Sontheimer, Riverside, Conn.

Application October 24, 1947, Serial No. 781,834

16 Claims. (Cl. 178—44)

The present invention relates to systems of automatic control and adjustment. More particularly it relates to methods of and apparatus for controlling or tuning automatically a system in which two or more interdependent variables, affecting a common result, must be individually adjusted to achieve and maintain optimum operating conditions. For example, in many electrical systems at least two such adjustments are required to tune the system for efficient operation. Any one of these adjustments will have an effect on, for example, the power output of the system and will influence also the effect produced by other adjustments. Tuning such a system is, therefore, a relatively complicated procedure requiring tedious alternate incremental adjustment of the various controls. For this reason automatic control of such systems is difficult and they have been controlled ordinarily by hand operation. Although, such hand adjustment is practical for certain applications where the conditions of operation are not subject to frequent variation and, therefore, the adjustment once effected does not require further attention; it is entirely inadequate for many applications, e. g. where the system must be re-adjusted frequently to compensate for changed operating conditions or where the operating conditions change rapidly so that adjustment by tedious hand methods is impossible. The present invention is concerned with the automatic control of such systems.

An ordinary automobile storage battery connected to a load, may be taken as an example of a simple direct current electrical system. The efficiency of this system depends upon the relationship between the resistance of the load and the internal resistance of the battery. Such a system operates with the highest rate of power transfer when these two resistance values are equal.

Similar, but usually more complex, relationships are applicable to the transfer of energy in alternating current systems. To obtain the greatest absolute power transfer under given conditions, reactive circuit elements i. e. inductors and capacitors are connected in the load circuit and adjusted so that the impedance presented to the generator by the load is the conjugate of the complex number representing the internal impedance of the generator. If the alternating current frequency is low, so that the transmission line between the generator and the load is short, electrically, these reactive elements may be placed at the terminals of the generator. In higher frequency systems, in which the transmission line connecting the generator with the load may be several wavelengths long, the characteristics of the transmission line become increasingly important. High frequency energy traveling along such a transmission line will be completely absorbed by a load connected across the terminals of the line, provided the load has a resistance value equal to the characteristic impedance of that line. Any other value of load or terminating resistance will cause a portion of the energy to be reflected by the termination with resulting increased copper and dielectric losses. In many cases it is desirable, therefore, to provide a tuning circuit which will transform the impedance of the load to a value equal to the characteristic impedance of the transmission line. In other cases, as mentioned above, the characteristics of the generator may be such that it is more desirable to transform the load impedance to the value which causes the greatest absorption of power by the load even though this value does not coincide with that which would produce the minimum reflection of electrical energy.

Such transformations of load impedance may be accomplished by any one of many well-known reactive networks. However, if such a network is to be used where the operating conditions are subject to relatively wide changes, it is necessary to adjust at least two parameters of the network in order to secure optimum operation under the various conditions.

Such adjustments, once made, produce the desired results only so long as the conditions of operation e. g. the frequency of the alternating current, characteristics of the load, etc., remain unchanged; however, if one of these operating conditions undergoes appreciable change, optimum operation can be restored by changing the values of the reactive elements. For this reason it is usual practice to provide for mechanical variation of the values of these reactive matching elements so that the circuit may be adjusted or tuned readily for the highest efficiency or for the greatest amount of power transfer under the particular conditions of operation. These tuning networks, formed generally of reactive elements, may include, for example, combinations of variable capacitors or inductors, adjustable open or short-circuited transmission line stubs, or coils having adjustable mutual inductance.

In the present system, which is concerned with the automatic and continual adjustment of these reactive tuning elements to maintain the desired operating conditions even with large changes in the load reactance or operating frequency, the values of each of these reactive elements are caused to vary continually with time over a relatively small portion of their respective ranges; the law of the periodic variation being different for each element. The small periodic disturbances which are caused in the system by these continually varying elements are separated by suitable means, operating according to the particular laws of variation of the reactive elements, and applied to sensing apparatus which determines the individual incremental effects of the respective tuning elements and automatically causes individual corrective adjustment of the mean values of the elements so that the desired optimum condition is maintained.

The optimum condition which is to be maintained will depend upon the purpose, construction, and mode of operation of the particular system. For example, in many cases it is desirable to secure maximum absolute power transfer from the generator to the load, without particular regard for efficiency. In other applications it may be desirable to maintain certain other parameters at maximum or minimum values without particular regard for absolute power transfer or other factors.

It is accordingly an object of this invention to provide an automatic system for the control of the transfer of energy from one point to another under variable operating conditions.

It is a further object of this invention to provide an electrical system for adjusting automatically the impedance relationship between a load and a transmission line to achieve a predetermined tuning condition.

It is another object to provide such a system in which the predetermined tuning condition is maintained automatically even in the presence of large changes in the operating conditions, as for example, in the incident frequency or in the load impedance.

Another object is to provide methods and apparatus for adjusting the impedance relationships between a load and a source of electrical energy.

In this specification and the accompanying drawings, there is shown and described a preferred embodiment of the invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

Figure 1:
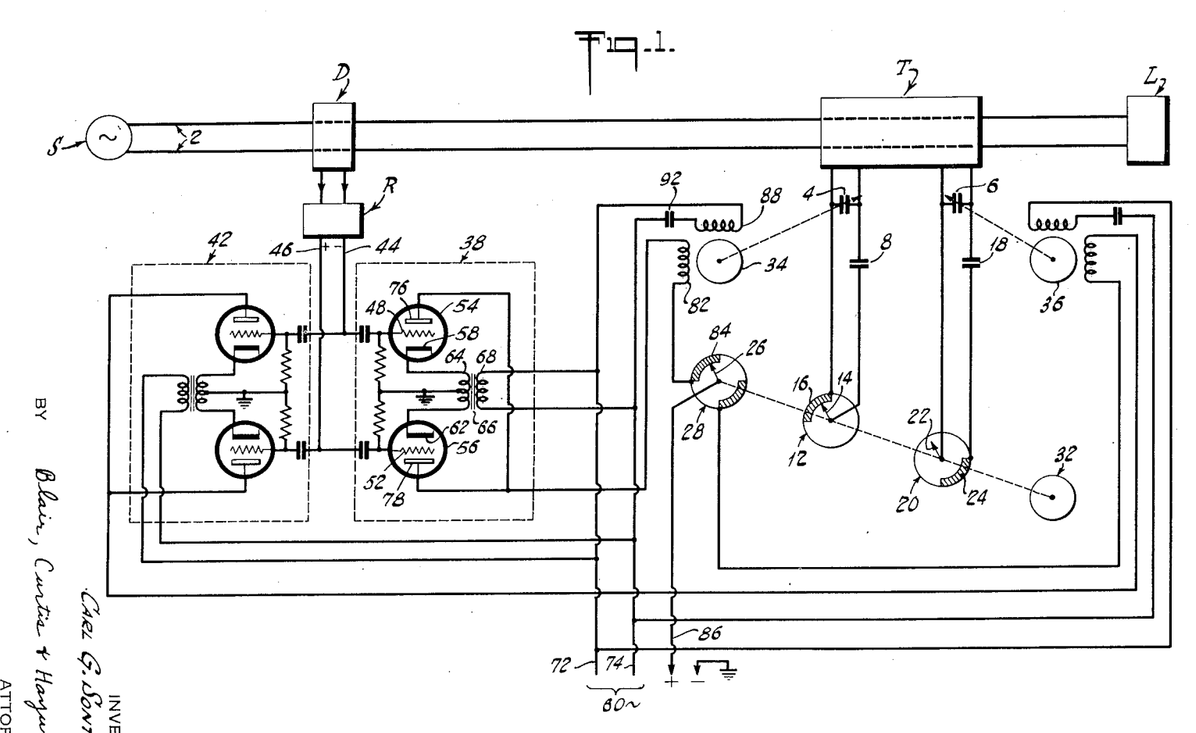
Figure 1 is a schematic and diagrammatic representation of a high frequency system, with automatic control, for the transfer of high frequency energy.

An electrical system is shown in Fig. 1 for the purpose of illustrating certain principles of the present invention. A high frequency generator S is connected through a suitable transmission line 2, which for the purposes of this example may be considered to be an open wire line, to a load L. A matching network T, of any desired type, is coupled to the transmission line 2 for the purpose of transforming the impedance of the load L to a value such that the maximum proportion of the energy moving along the transmission line 2 is absorbed by the load L and the least amount of energy is reflected toward the source S.

A directional coupler D is loosely coupled to line 2 so that it extracts only a small fraction of the total energy from the line and is arranged so that it is responsive only to energy which is reflected from the load L and the matching network T. A voltage is delivered, therefore, from the directional coupling unit D which is a function of the reflected energy on the transmission line 2. In other words, the directional coupler D is responsive only to electrical waves traveling to the left along line 2, from the load toward the source S, and is not responsive to waves traveling along the line in the direction of the load.

The matching network T is provided with two variable tuning elements, as for example, condensers 4 and 6.

These condensers form part of the matching network T and are so arranged that by individual adjustment of the condensers it is possible to secure minimum reflection of energy on the transmission line 2 under widely variable conditions of operation. For example, the system represented may be used to cure thermosetting resin placed between suitable electrodes to form the load L. High frequency energy is applied to the material and by heating, or other effects, produces hardening of the plastic material. The impedance of the load may vary rapidly during this curing process, because of the changing characteristics of the resin which forms part of the load circuit. If the entire process is to be conducted with high efficiency, it is necessary that condensers 4 and 6 be re-adjusted during the curing process.

A fixed condenser 8, which desirably has a value much smaller than the difference between the minimum and maximum values of condenser 4, is connected to a continuously rotating selector switch 12 having a rotor arm 14 and a contact segment 16. This switch is arranged so that as rotor arm 14 rotates continuously, the fixed condenser 8 is connected in parallel with the variable condenser 4 during one-fourth of each revolution of rotor arm 14.

A similar condenser 18 is connected to a selector switch 20 having a rotor arm 22 and a contact segment 24 and which is arranged to connect condenser 18 in parallel with the variable condenser 6 during one-fourth of each revolution of rotor arm 22.

The rotor arms 22 and 14 together with rotor arm 26 of a selector switch 28, the function of which is described later, are driven by a common shaft which is rotated continuously by a motor, indicated diagrammatically at 32. The switch segments 24 and 16 are located in opposite quadrants relative to the rotation of their respective rotors so that condensers 8 and 18 are connected alternately in the circuit with intervening intervals of time when neither of these condensers forms a part of the matching network.

Condensers 4 and 6 are of the variable type with their rotor portions, and thus their effective capacitance values, controlled respectively by motors 34 and 36 which are connected thereto by suitable speed reduction assemblies (not shown).

With this arrangement, assuming that motor 32 is running and that motors 34 and 36 are not rotating, the energy reflected along the transmission line 2 will vary continually in accordance with the rotation of rotor arms 14 and 22 which alternately vary, by a small amount, the effective capacity in the respective branches of the matching network T.

Assume that condenser 4 is adjusted to a position such that, under the particular conditions of operation, its capacity is lower than that required for minimum reflection of energy along transmission line 2. When rotor arm 14 contacts segment 16 it connects condenser 8 in parallel with condenser 4, thus increasing slightly the total capacity of this branch of the matching network. Under the above assumed conditions this increased capacity reduces the amount of reflected energy during the time that rotor arm 14 is in contact with segment 16.

In a similar manner, if condenser 6 is at the moment adjusted to a value lower than that required for a minimum reflection of energy along line 2, the reflected energy will be reduced slightly during the time that switch 20 closes the circuit connecting the condenser 18 in parallel with condenser 6.

If, at a particular moment, the values of condensers 4 and 6 are adjusted to provide a capacitance value greater than that required to produce the minimum reflection of energy, the reflected energy would be increased during the periods of time when selector switches 12 and 20 connect condensers 8 and 18, respectively, in the matching network.

Thus, a time relationship is established between the incremental variations of the capacities in the two branches of the matching network and the determination of the direction of change of the values of capacitors 4 and 6, i. e. whether they should be increased or decreased, respectively, to produce minimum power reflection, may be obtained by noting the decrease or increase in the amount of reflected energy as a function of the rotation of rotor arms 14 and 22. This information is taken from the line 2 by means of the directional coupler D, which is responsive only to reflected energy, and utilized to control the motors 34 and 36 to adjust thereby the variable condensers 4 and 6 for optimum operating conditions.

The signal from the directional coupler D is rectified by a conventional type rectifier circuit R and the resulting output signal applied to two inverters, indicated generally at 38 and 42.

The polarity of the signal delivered by the rectifier, for the purposes of this example, is assumed to be such that lead 44 is negative and lead 46 is positive. The alternating component of the signal on leads 44 and 46 is applied between control grids 48 and 52 of triode tubes 54 and 56, respectively, of the balanced inverter 38.

The cathodes 58 and 62 of vacuum tubes 54 and 56, respectively, are connected to ground through opposite halves of a center-tapped secondary winding 64 of a transformer 66. The primary 68 of this transformer is connected to supply leads 72 and 74 which in turn are connected to a suitable source of alternating current, as for example, 110 volt-60 cycle power mains. Thus, transformer 66, introduces a 60 cycle signal into the cathode circuits of the two tubes; the signal which is introduced into the cathode circuit of tube 54 being at all times 180 degrees out of phase with the signal introduced into the cathode circuit of tube 56.

The anodes 76 and 78 of these tubes are connected together and to a source of positive voltage through winding 82 of the two phase reversible induction motor 34, and contact segment 84 and rotor 26 of switch 28, to a voltage supply lead 86 which is connected to the positive terminal of a suitable power supply (not shown).

When the grids 48 and 52 of the vacuum tubes 54 and 56 are at the same potential, the alternating variations, produced in the respective plate currents by the transformer 66, have the same magnitude and are 180 degrees out of phase and thus cancel because the anodes are connected together. However, when the potentials of these two grids are not the same, one tube or the other draws a greater current and thus the alternating components introduced into the plate currents by the transformer 66 have different magnitudes and do not cancel in the output circuit; the alternating component remaining in the output circuit is either in phase with the 60 cycle line voltage appearing on supply leads 72 and 74 or is displaced therefrom by 180 degrees depending upon whether the larger amount of current is flowing through tube 54 or tube 56. Thus, the current passing through winding 82 of the two phase motor 34 has an alternating component either in phase with the 60 cycle line voltage or displaced 180 degrees therefrom.

The power mains 72 and 74 are connected to winding 88 of motor 34 through a phase-shifting condenser 92 in the conventional manner. The direction of rotation of the armature of motor 34 is dependent, therefore, upon whether the current through winding 82 is leading or lagging the current through winding 88 and, thus, is dependent upon whether tube 54 or tube 56 is conducting the larger plate current.

The operation can be explained best by assuming that both condensers 4 and 6 are adjusted to values lower than that required for minimum reflection of energy. The voltage delivered by rectifier R will have a waveshape similar to that shown in Fig. 2 as a function of the angular position of rotor arms 14, 22, and 26 (indicated by arrows in Fig. 2) which are driven by the motor 32.

Figure 2:
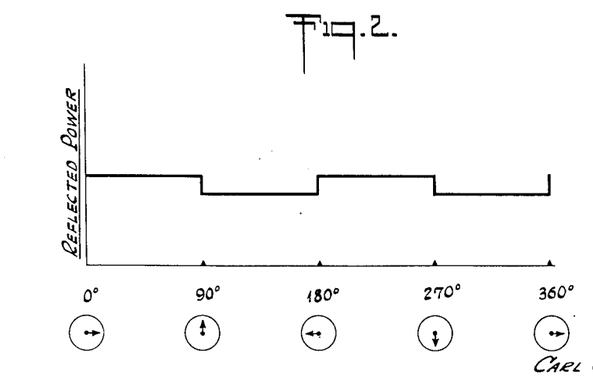
Figure 2 shows the variation of reflected energy in the system of Fig. 1 as a function of time under one condition of operation.

Thus, with the specified conditions, a negative signal is applied to grid 52, relative to the potential of grid 48 during the time that the rotors of switches 12 and 20 are between 90 and 180 degrees of rotation, and again during the time they are between 270 and 360 degrees. Thus, during the time that rotor 14 is rotating from zero to 90 degrees, condenser 8 is not connected in the tuning circuit and there is no current through winding 82 of motor 34, because rotor 26 is not in contact with segment 84 of switch 28. When the rotor reaches the 90 degree vertical position rotor 26 closes the circuit with segment 84, applying the positive voltage from lead 86 through the motor winding 82 to the anodes 76 and 78 of the balanced inverter 38. Simultaneously, rotor 14 of switch 12 closes the circuit with segment 16, connecting condenser 8 in parallel with condenser 4, and as shown in Fig. 2 the amount of energy reflected along line 2 is reduced incrementally by an amount depending upon the value of condenser 8. This reduction in reflected energy reduces the voltage appearing between conductors 46 and 44 at the output of rectifier R. The alternating component of this voltage is applied to the grids 48 and 52 causing grid 48 to become positive with respect to grid 52.

Thus, the plate current through tube 54 is larger than the plate current through tube 56, producing in the plate current (and thus in the current through winding 82) an alternating component having a phase relative to the current through winding 88 such that motor 34 is caused to rotate in the direction that causes an increase in the capacitance value of the condenser 4.

When rotors 26 and 14 of switches 28 and 12, respectively, have reached the 180 degree position, condenser 8 is disconnected from the circuit and plate voltage is removed from the inverter 38. No further action occurs in this circuit until these rotors again reach the 90 degree position, when motor 34 is again energized in one direction or the other depending upon whether the introduction of condenser 8 into the circuit increases or decreases the amount of reflected energy.

However, during the intervening period the similar circuit, which comprises tuning condenser 6 and its adjusting motor 36, operates in exactly the same manner by means of the balanced inverter 42, to adjust condenser 6 in the proper direction.

The system thus automatically and continuously adjusts the tuning of the matching network T so that minimum energy is reflected along the line 2 and thus the maximum amount of energy incident on the line 2 is absorbed by the load L.

If the system is such that wide frequency variation is contemplated, the directional coupler D should be of the broadband type, however, if the frequency is constant and the only changes expected are those resulting from changes in the impedance of load L the directional coupler D may be a relatively narrow band type.

Figure 3:
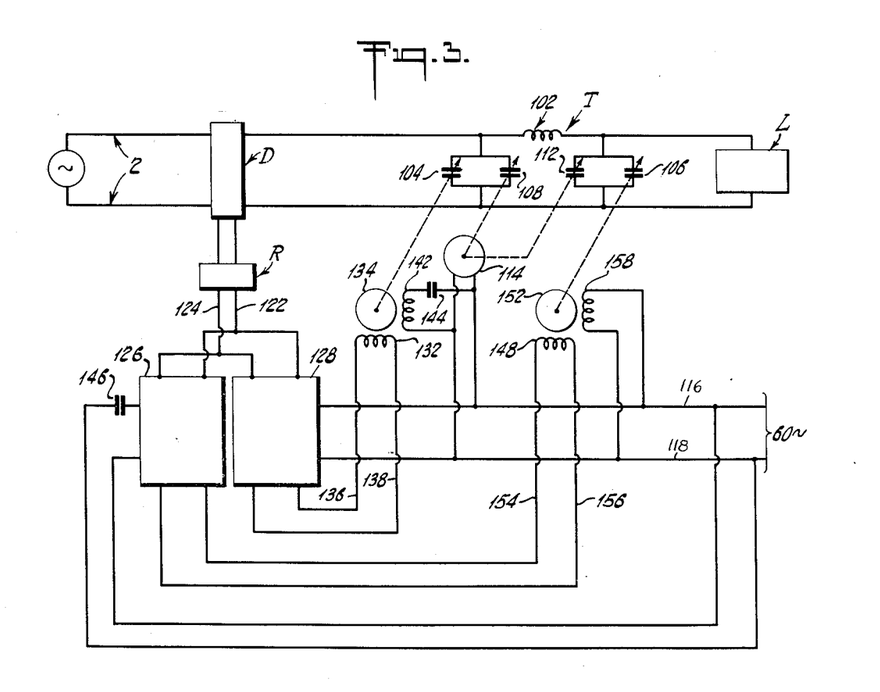
Figure 3 is a schematic and diagrammatic representation of another form of the system shown in Fig. 1.

In the system just described the periodical disturbances corresponding to incremental variations of the individual tuning elements were staggered in time, the information being separated by means of synchronized inverter circuits. A system is shown in Fig. 3 in which the periodical variations are such that when expressed in accordance with Fourier series one of the varying quantities contains no cosine terms and the other contains no sine terms. The operation of this system is similar to the one just described, except that in this case the condensers which produce the periodic variations are rotated continuously rather than being switched into and out of the circuit as a function of time.

High frequency electrical energy is provided from a source S through a transmission line 2 to the load L. As in the previous arrangement, a matching network T is provided which includes an inductance 102, variable condensers 104 and 106, which are individually adjustable to provide optimum conditions for transferring energy to the load L, and variable trimmer condensers 108 and 112 connected in parallel with condensers 104 and 106, respectively, for the purpose of providing the incremental variations in the reflected energy. A directional coupler D and rectifier R, are provided for the same purposes as in the previous example.

An induction motor 114 operated from 60 cycle power mains 116 and 118 drives rotors of condensers 108 and 112 continuously at a suitable speed and, for the purposes of this example, may be considered to have a speed of thirty-six hundred R. P. M. Condensers 108 and 112 are similar to one another in construction so that both condensers produce the same pattern of capacity change with respect to time; however, the rotors are so oriented on their respective drive shafts that the periodic variations in capacity are displaced in time. In this example, condensers 108 and 112 have their rotors so cut and so oriented on their respective drive shafts from motor 114 that the instantaneous capacitance value of condenser 108 is:

$$C_{108} = C_{108M} + \tfrac{1}{2} C_{108D}(1 + \sin wt) \quad (1)$$

where $C_{108M}$ is the minimum capacity of condenser 108, $C_{108D}$ is the difference in capacity between minimum and maximum settings of the condenser, and $wt$ is the angular rotation of the armature of motor 114. The instantaneous capacitance value of condenser 112 is:

$$C_{112} = C_{112M} + \tfrac{1}{2} C_{112D}(1 + \cos wt) \quad (2)$$

where $C_{112M}$ is the minimum capacity of condenser 112, and $C_{112D}$ is again the capacity difference between minimum and maximum settings of the condenser.

Thus, the periodic variation in the reflected energy along transmission line 2 has one incremental component which is a function of the sine of the angle of rotation of the rotor of condenser 108 which, in this example, rotates in unity relationship with the voltage on power mains 116 and 118. The condenser therefore, may be constructed so that this reflected energy component is in phase with the voltage on supply mains 116 and 118. There is a second alternating component in the reflected power which is a cosine function of the angle of rotation of the rotor shaft of condenser 112 and which, therefore, leads or lags by 90 degrees the voltage on power mains 116 and 118.

The output of directional coupler D, therefore, varies in accordance with these reflected components. The rectifier R eliminates the radio frequency components and applies to leads 122 and 124 a voltage having alternating components in accordance with the change in reflected power on transmission line 2.

The voltages on leads 122 and 124 are applied to two balanced modulators 126 and 128. Balanced modulator 128 is supplied with alternating current directly from the 60 cycle mains 116 and 118 and is, therefore, responsive selectively to the sine component in the reflected wave produced by the rotation of condenser 108. The instantaneous polarity of the component depends, as in the previous example, upon whether the power in this component of the reflected wave increases as the capacity of condenser 108 is increasing, or whether the reflected power in this component decreases as the capacity of condenser 108 increases. The instantaneous polarity of the sine components of the control voltage applied to balanced modulator 128 through leads 122 and 124 determines whether the current which is supplied to a winding 132 of a two phase reversible motor 134 through leads 136 and 138 is in phase with the voltage of the power mains 116 and 118 or whether it is displaced therefrom by 180 degrees. This in turn determines whether the field set up by winding 132 is leading or lagging, by 90 degrees, the field produced by winding 142 of the same motor which is supplied from power mains 116 and 118 through a phase-shifting condenser 144. The leads 136 and 138 are connected to the winding 132 so that this motor is caused to rotate in the direction which will increase or decrease the capacity of condenser 104, the setting of which is controlled thereby, so as to adjust the reactance of that portion of the tuning circuit in the direction which will reduce the power reflected along the line 2.

The voltage appearing on leads 122 and 124 from the rectifier R is also applied to the balanced modulator 126. The supply voltage for this balanced modulator is provided from power mains 116 and 118 through a phase-shifting condenser 146 thereby producing a current that is in phase quadrature with the line current which is applied to balanced modulator 128. Balanced modulator 126 is responsive, therefore, selectively to the cosine components of the voltage delivered by the rectifier R, and produces a current through winding 148 of a two phase reversible motor 152. The current, which is applied to this winding through leads 154 and 156, is either leading or lagging by 90 degrees, the current through motor winding 158, which is supplied directly from power mains 116 and 118, depending upon whether the reflected power is increased or decreased as the value of condenser 112 is increased.

The leads 154 and 156, are connected to the winding 148 of motor 152 so that this motor is caused to revolve in such a direction that it adjusts the capacitance value of condenser 106 to reduce the reflected power along the transmission line 2.

The above embodiment of the invention, therefore, provides a convenient method of adjusting continuously and automatically the circuit elements of a matching device so that minimum power is at all times reflected along the line 2, irrespective of wide changes in the impedance of the load.

The following discussion of the alternating components in the reflected wave may be helpful for a better understanding of the operation of this system. The time varying component $dR_c$ of the reflection coefficient $R_c$ is:

$$dR_c = \frac{\partial R_c}{\partial C_{104}} dC_{104} + \frac{\partial R_c}{\partial C_{106}} dC_{106} \quad (3)$$

where $C_{104}$ denotes the total capacitance of condensers 104 and 108, and $C_{106}$ denotes the total capacitance of condensers 106 and 112. With regard for Equations 1 and 2 this may be written as follows:

$$dR_c = \frac{\partial R_c}{\partial C_{104}} C_{108} \sin wt + \frac{\partial R_c}{\partial C_{106}} C_{112} \cos wt \quad (4)$$

If for any given setting of condensers 104 and 106

$$\frac{\partial R_c}{\partial C_{104}}$$

is positive, then condenser 104 should be reduced in capacity to minimize R; if however, this quantity is negative, then the capacity of condenser 108 should be increased. In a similar manner, the sign of $$\frac{\partial R_c}{\partial C_{106}}$$

indicates whether the capacity of condenser 106 should be increased or decreased in order to decrease the energy reflected along the transmission line 2, i. e. to minimize the reflection coefficient $R_c$.

When the matching network T is adjusted properly so that the minimum amount energy is reflected along the transmission line 2, so that $$\frac{\partial R_c}{\partial C_{104}} = \frac{\partial R_c}{\partial C_{106}} = 0 \quad (5)$$

Equation 4 indicates that $dR_c = 0$. In other words, there is no instantaneous change in the amount of reflected energy. However, Equation 4 is based on the assumption that condensers 108 and 112 are infinitesimal as compared to the capacitances of condensers 104 and 106, $dR_c$ will vary, therefore, at a 120 cycle rate, but the 60 cycle variation vanishes.

The function of the directional coupler and the balanced modulators is to separate the information that has been made available, and to convey it to the control motors 134 and 152. When the output of the directional coupler D, which is the "$dR_c$" of Equation 4 is applied to modulator 128, the output of this modulator will be proportional only to the term of $dR_c$ which varies as sine $wt$. The output of modulator 128 will thus be a 60 cycle voltage, proportional to $$\frac{\partial R_c}{\partial C_{104}}$$

and which will reverse in phase when $$\frac{\partial R_c}{\partial C_{104}}$$

changes sign. In a similar manner the output of modulator 126 is a 60 cycle voltage proportional $$\frac{\partial R_c}{\partial C_{106}}$$

and which reverses in phase when the sign of this quantity reverses.

When these signals, after amplification if required, are applied in proper phase to motors 134 and 152, they will cause these motors to adjust condensers 104 and 106, respectively, in the directions necessary to decrease the energy reflected along the transmission line 2.

Although line 2 has been considered to be a two wire open transmission line, the system is applicable obviously to all types of transmission lines including, for example, coaxial lines and wave guides.

Several matching systems suitable for use in the above described system are shown in Figs. 4 to 7.

Figure 4:
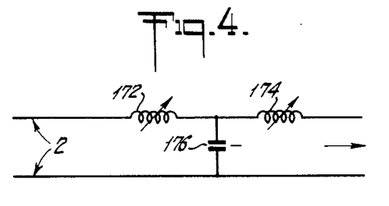
Figs. 4, 5, 6, and 7 show various forms of tunable reactive matching networks.

Fig. 4 illustrates a matching network having two variable inductances 172 and 174 and a fixed capacitor 176. The inductive elements 172 and 174 may be varied by any suitable means as, for example, by moving a core of powdered iron material relative to the coil winding to vary the inductance.

This network is the equivalent of the matching network T of Figs. 1 and 3; the variable inductances 172 and 174 corresponding, respectively, to the variable condensers 4 and 6 in Figs. 1 and 104 and 106 in Fig. 3. The incremental variations may be produced by superimposing vibrational movements of small magnitude on the adjustable iron cores of these inductances, or auxiliary elements may be provided, as for example, small inductances placed in series with inductance elements 172 and 174, respectively, and for operation in the system of Fig. 1, alternately connected in and shorted out of the circuit; for the system shown in Fig. 3 the inductance values of these auxiliary elements would be varied sinusoidally, as by continuously moving cores.

Figures 5, 7, 8, 9:
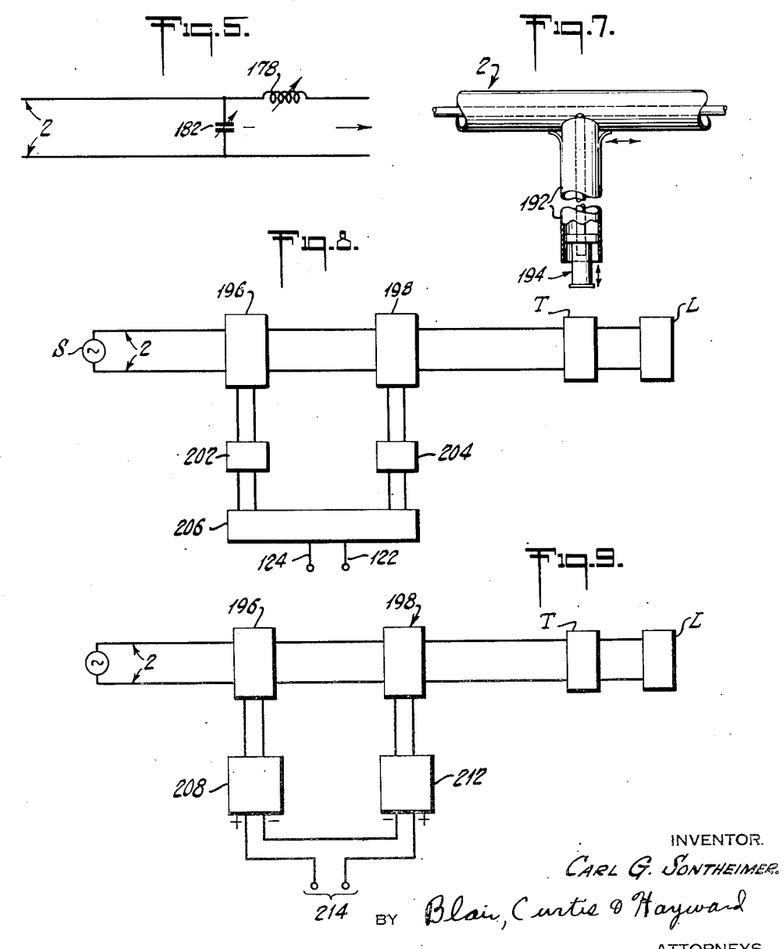
Fig. 8 represents diagrammatically a high frequency control system in which the control voltage is a function of the reflected energy and independent of the absolute energy level.
Fig. 9 represents diagrammatically such a system in which the control voltage is a function of the amount of energy being absorbed by the load.

Fig. 5 shows another tuning arrangement in which one variable element is an inductance 178 and the other is a condenser 182.

As in the above example, these variable reactive elements form the primary tuning controls of the network and the incremental variations may be provided by incremental adjustment of these elements or suitable auxiliary elements may be added.

Figure 6:
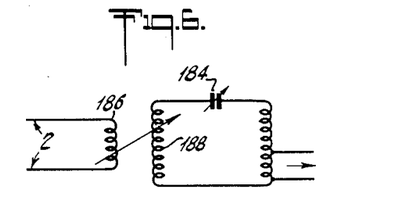

Fig. 6 shows still another tuning arrangement in which one of the variable elements is a condenser 184 and the other variation is obtained by changing the mutual inductance between two coils 186 and 188, which may be accomplished by changing the physical positions of the coils relative to each other or by altering the reluctance of the flux path linking the two coils.

Fig. 7 shows a coaxial line in which the matching element consists of a stub 192. The inner and outer conductors of the stub 192 are slidably connected, respectively, to the inner and outer conductors of the transmission line 2. The outer conductor of line 2 is provided with a longitudinal slot through which the inner conductor of stub 192 extends so that the system may be tuned by (1) moving the stub 192 longitudinally along the transmission line, and (2) by changing the effective length of the stub by moving a short circuiting plunger 194 longitudinally within the coaxial line stub 192.

With such tuning arrangements, separate elements may be provided for the purpose of introducing the incremental variations in tuning adjustment or suitable mechanical vibrations may be superimposed upon the mechanism controlling the settings of the main tuning elements.

It is also apparent that the present system is applicable to arrangements in which the reactance is introduced without the use of mechanically movable components, as for example, where a vacuum tube is employed as a reactance element, in which case the incremental variation can be a voltage imposed upon the control voltage of one or more electrodes of the reactance tube.

The directional coupler D is of conventional type, and produces an output voltage proportional to the reflection coefficient of the load and therefore is zero, in this example, when the load impedance, as transformed by the matching element T, is equal to the characteristic impedance of the transmission line.

In Fig. 8 is shown a system wherein a voltage is delivered to the balanced modulators, which is a function of the reflection coefficient of the load, and is independent of variation in the absolute energy level on the transmission line 2. In this arrangement, two directional couplers 196 and 198 are coupled to the transmission line 2. Directional coupler 196 is oriented so that it is responsive, as in the above example, only to energy reflected from the load L and matching network T. Directional coupler 198 is oriented so that it is responsive only to energy incident on the load L and matching network T.

The output voltages of directional couplers 196 and 198 are rectified by rectifiers 202 and 204, respectively; the output voltage from these rectifiers being applied to a ratio-taking amplifier 206 so that the output voltage between leads 122 and 124, which is to be applied to the balanced modulators, is a function of the reflection coefficient of the load, i. e. of the ratio of reflected to incident waves, and is not affected by variations in the actual power being transmitted along the transmission line 2. Thus, only variations in the impedance of the load L, as modified by the adjustment of the matching network T, will affect the voltage appearing between leads 122 and 124.

As in the above examples, this voltage is applied to balanced modulators and control equipment which separate the alternating components and in accordance therewith adjust the values of the reactive elements in the network T to maintain the minimum reflection coefficient.

In Fig. 9, the two directional couplers 196 and 198 are oriented in opposite directions, as in the preceding example. The output voltages of these couplers 196 and 198 are rectified by two square law rectifiers 208 and 212, so that the output voltage is proportional to the square of the voltage applied to the rectifiers. The output circuits of rectifiers 208 and 212 are connected together in such a manner that the difference between the output voltages appears between terminals 214. This output voltage, which is proportional to the net power delivered to the load L, is utilized as disclosed above to control the tuning of the matching network T. Such a system has obvious utility where it is desired to tune automatically the network T so that the largest possible amount of power is supplied to the load L, which, in some instances, may be a condition different from the condition that exists when the reflection coefficient is reduced to zero.

Figure 10:
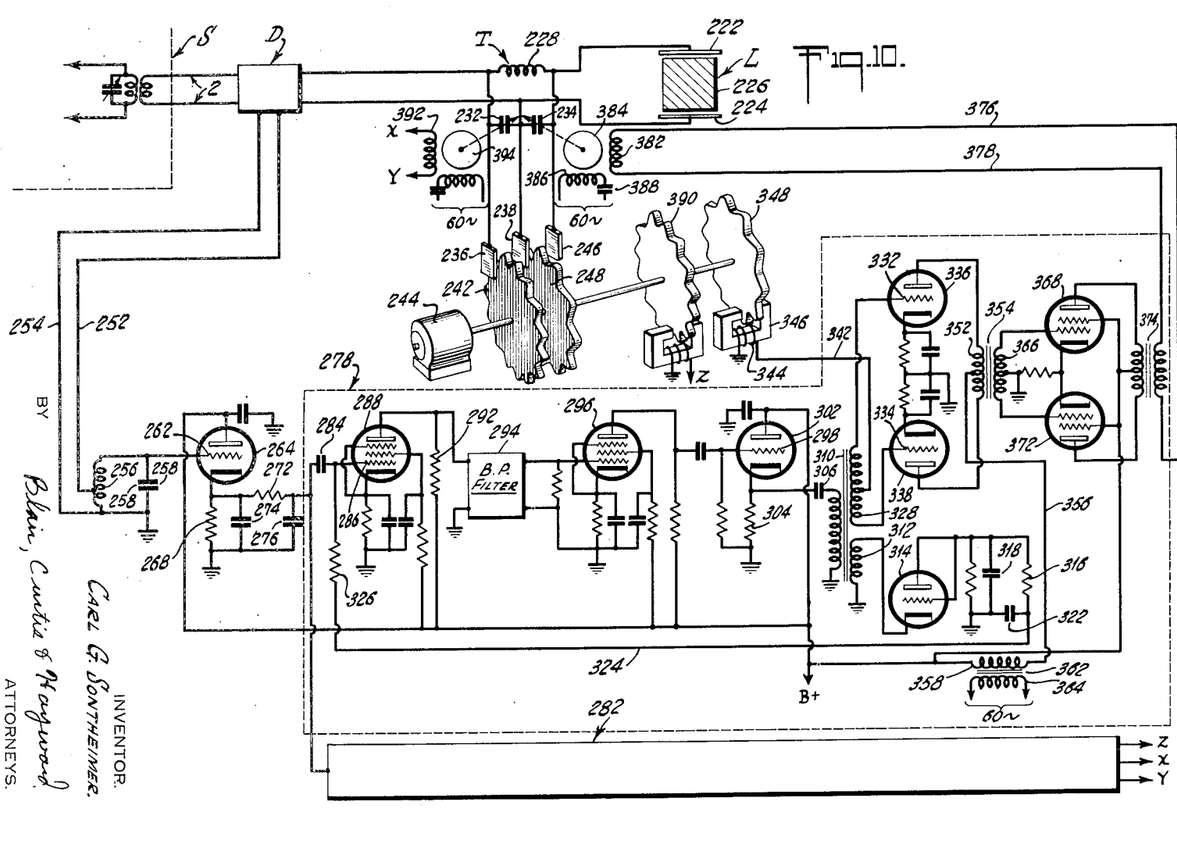
Fig. 10 is a schematic diagram of still another electrical transfer system embodying the invention.

Another embodiment of the invention, in which the incremental variations in matching adjustments are distinguished by difference in frequency, is shown in Fig. 10.

A high frequency generator S operates, for example, at a frequency of twenty-five megacycles and is designed to deliver ten kilowatts of power. This power is coupled by the transmission line 2 to the load L, which may comprise electrodes 222 and 224 and material 226 which is to be heated or otherwise treated with the high frequency energy. If the matching network T is adjusted for efficient operation under the initial conditions of treatment, chemical or physical changes may be produced quickly in the material 226 which will change the impedance characteristics of the load so that the efficiency of the system rapidly decreases. These changes may take place rapidly so that it would be impossible to keep pace with them by tedious hand adjustment of the reactive components of the matching network T. The apparatus in Fig. 10 is provided to accomplish this adjustment instantaneously and continuously so that optimum operating conditions are maintained at all times.

The matching network T includes an inductor 228 and two main tuning condensers 232 and 234. A trimmer condenser in parallel with condenser 232 for producing a continuous incremental variation in the adjustment of the matching network T is formed by two parallel spaced metal plates 236 and 238. In order to change the capacity between these plates, without resorting to slip rings or other sliding electrical connections, which often cause troublesome spurious signals, a disc 242 of dielectric material, preferably having a high dielectric constant, is rotated between the plates 236 and 238 by a synchronous motor 244. The periphery of this disc is provided with outwardly projecting teeth so that as disc 242 rotates, the capacity between plates 236 and 238 varies as a function of the amount of dielectric material in the space between the plates.

The disc 242 is provided, for example, with a total of fifteen teeth, or outwardly extending projections, and the rotation of the armature of motor 244 is synchronized with the frequency of the power mains at a speed of 1800 R. P. M. The capacity between plates 236 and 238 will therefore vary, e. g. sinusoidally, at a rate of 450 cycles per second.

A similar trimmer condenser connected in parallel with condenser 234 is formed by spaced parallel plates 238 and 246. The capacity of this condenser is varied, e. g. sinusoidally, by a similar rotating disc 248 also driven by motor 244. Disc 248 has a total of 10 outwardly extending teeth and thus produces a capacity variation at the rate of 300 cycles per second.

The directional coupler D, as in the previous examples, is responsive only to the reflected energy on line 2. This reflected energy now has two incremental components one of them varying at a rate of 300 cycles per second and the other at the rate of 450 cycles per second.

The energy from coupler D is connected by leads 252 and 254 to a series circuit including an inductor 256 and a condenser 258. This circuit is resonant at the frequency of the signal delivered by the source S, in this example 25 megacycles, so that a relatively high voltage is developed across condenser 258 and, thus, applied to control grid 262 of a triode vacuum tube 264 which is connected as a cathode follower detector. The output voltage is developed across a cathode resistance 268 and applied to a filter circuit consisting of a resistor 272 and capacitors 274 and 276.

The 300 and 450 cycle signals delivered by this circuit are applied to a 300 cycle control circuit shown in detail within the broken line 278 and to a similar 450 cycle control circuit indicated in block diagram form at 282.

The 300 and 450 cycle signals are coupled through a condenser 284 to control grid 286 of a pentode amplifier tube 288. The amplified voltages appearing across plate load resistance 292 are fed into a band pass filter 294 which passes the 300 cycle signal but rejects the 450 cycle signal. The 300 cycle signal from filter 294 is amplified by a pentode tube 296, connected in a conventional amplifier circuit, and applied to control grid 298 of a triode tube 302 which is connected as a cathode follower.

The 300 cycle signal voltage developed across cathode resistance 304 of the cathode follower tube 302 is coupled through a condenser 306 to the primary winding 308 of a transformer 310.

A secondary winding 312 of transformer 310 drives an automatic gain control circuit for adjusting the amplification of vacuum tube 288. This arrangement is desirable because the incremental variations in capacity produce relatively small reflected signals when the matching network T is near optimum adjustment and a very much larger signal when the network T is far from proper adjustment.

The signal induced in winding 312 is rectified by a diode-connected vacuum tube 314 and the resulting signal filtered by a resistance-capacitance network including resistor 316 and condensers 318 and 322. The resulting direct voltage, which is negative with respect to ground is applied through lead 324 and a series resistor 326 to control grid 286 of tube 288. This signal regulates the bias voltage, and thus the amplification, of tube 288, which is preferably of the remote cut off type, in accordance with the magnitude of the 300 cycle signal delivered by the directional coupler D.

Another secondary winding 328 of transformer 310 is connected between control grid 332 and control grid 334 of triode tubes 336 and 338, respectively. These tubes are connected in a balanced modulator circuit which delivers a 60 cycle signal that is either in phase, or 180 degrees out of phase, with the 60 cycle supply voltage.

The transformer winding 328 is center tapped and returned to ground through a lead 342 and a winding 344 which surrounds a permanently magnetized armature 346. A ferromagnetic disc 348 having the same geometrical configuration as disc 248, i. e. 10 outwardly projecting teeth, is interposed between the pole faces of magnetic armature 346. This disc 348 is secured to the same drive shaft as disc 248 and as it rotates varies the reluctance of the magnetic circuit of armature 346 and induces a corresponding voltage in winding 344.

Thus, a voltage is impressed on grids 332 and 334 which is in phase with the capacity variations produced by disc 248, and another voltage, derived from winding 328 and 180 degrees out of phase on the two grids, in superimposed thereon.

The voltage from winding 344 will be in phase with the voltage applied by transformer 310 to one of these grids and 180 degrees out of phase with the voltage applied thereby to the other grid. The tube to which the two voltages are applied in the same phase relationship will have a larger anode current than the other. Thus, whether tube 336 or tube 338 draws the larger anode current depends upon whether an increase in capacity between condenser plates 238 and 246 causes an increase or decrease in the amount of energy reflected along line 2.

Positive voltage is applied to the anodes of tubes 336 and 338 from a center-tapped primary winding 352 of an output transformer 354 and lead 356. A secondary winding 358 of a transformer 362 is connected in series with lead 356 and superimposes, on the direct voltage, a 60 cycle alternating signal from a primary winding 364 which is connected to the alternating current power mains.

A 60 cycle voltage is thus induced in secondary winding 366 of transformer 354 which is in phase, or 180 degrees out of phase, with the voltage of the power mains dependent upon whether tube 332 or tube 334 is drawing the larger amount of current, or in other words, upon whether the capacity of condenser 234 of the matching network T should be increased or decreased to bring about a reduction in the amount of electrical energy reflected along line 2.

This 60 cycle signal from winding 366 is amplified by a push-pull power amplifier including tubes 368 and 372. The output signal is coupled by a transformer 374 and leads 376 and 378 to winding 382 of a two-phase reversible induction motor 384. The other winding 386 of this motor is supplied with 60 cycle alternating current through a phase shifting condenser 388 from the same power means that provided the 60 cycle voltage for the balanced modulator.

Motor 384 drives the rotor of condenser 234, through a suitable gear reduction train (not shown), in one direction or the other depending upon whether the current through winding 382 leads or lags the current through winding 386. The windings are connected so that the capacity of condenser 234 is increased or decreased as is required to reduce the reflection of energy along line 2.

The 450 cycle control circuit indicated in block diagram form at 282 is identical with the one just described in detail except that the band pass filter 294 is designed to pass 450 cycle signals with minimum attenuation and to reject 300 cycle signals.

Synchronizing voltage for the balanced modulator is provided, by way of terminal Z, from a ferromagnetic disc 390 having 15 teeth and the same physical configuration as dielectric disc 242.

The output voltage from the 450 cycle control circuit 282 is connected to terminals X and Y of winding 392 of a two-phase motor 394 which regulates the capacity of the matching network condenser 232.

From the foregoing it will be observed that the various embodiments of the invention are well adapted to attain the ends and objects hereinbefore set forth. These embodiments are provided in order to clearly demonstrate the invention but are subject to a variety of modifications as may be desirable in adapting the invention to different applications.

For example, it is not intended to limit the present invention to any particular matching network or system; but only to provide a matching device capable of being adjusted to the desired condition of operation and requiring independent adjustment of two or more matching elements.

The effective values of these matching elements must be varied continually in small increments or supplementary elements must be varied in this manner so that the tuning of the network is affected and so that the effect on the network is determinable in terms of the required corrective adjustment of the main tuning elements. The present invention is not intended to be limited to particular mechanical or electrical devices for bringing about these incremental changes, but to provide for such continual variations according to a different law of periodic variation for each element, or according to a predetermined relationship with another condition, so that the indication derived from the change in operating conditions can be separated into components each of which is a function of the change produced by the continual variation of a main or supplementary tuning element.

Although the various embodiments shown and described have employed one or more directional couplers to provide a voltage indication of the desired operating condition, it is apparent that other devices performing the same function, i. e. indicating the condition of operation, may be substituted for the directional coupler.

In order to separate the components of the signal delivered by a suitable device responsive to the conditions of operation of the system, filter and balanced modulator systems have been demonstrated. It is apparent, however, that other devices operating in accordance with the respective laws of variation of the tuning elements or by direct synchronization and, accordingly, capable of separating the individual components of the signal, may be employed to advantage in particular applications.

Any suitable system may be employed which in response to the respective components of this signal will produce individual adjustment of the tuning elements in such direction so as to produce the desired conditions of operation.

It will be obvious to those acquainted with electrical control systems that the choice of control frequencies will be controlled in part by the required speed of adjustment of the system, and that these frequencies must be sufficiently high to satisfy the requirements of the particular control problem.

I claim:

1. An automatic tuning system for use in radio frequency power systems, comprising a source of alternating electrical energy, a load for utilizing said energy, a transmission line conducting energy from said source to said load, an impedance matching network coupled to said system and having a first and a second electrical branch each having a reactive impedance of which a predetermined matching condition in said system is a function, cyclic means for producing small impedance variations in said first and second branches, respectively, and in accordance with predetermined and different laws of periodic variation, said means producing corresponding small changes in said matching condition, an indicator coupled to said system and producing a signal responsive to changes in said matching condition, said signal containing electrical components caused by said cyclic impedance variations in said first and second branches, respectively, a first transducer coupled to the output of said indicator and responsive selectively to components of said signal caused by said cyclic impedance variations in said first branch, a second transducer coupled to the output of said indicator and responsive selectively to components of said signal caused by said cyclic impedance variations in said second branch, a first impedance adjusting means coupled to the output of said first transducer and responsive to the output thereof and adjusting the mean impedance of said first branch in accordance with the value thereof, and a second impedance adjusting means coupled to the output of said second transducer and responsive to the output thereof and adjusting the mean impedance value of said second branch in accordance therewith, whereby the impedance of said first and second branches are adjusted automatically to maintain said matching condition at a predetermined optimum value.

2. Apparatus as described in claim 1 wherein said indicator comprises a directional coupler responsive selectively to reflected waves on said transmission line.

3. Apparatus as described in claim 1 wherein said indicator comprises two directional couplers one of which is selectively responsive to direct waves on said transmission line and the other of which is selectively responsive to reflected waves on said line.

4. Apparatus as described in claim 2 wherein said first and second transducers comprise first and second balanced modulators, respectively, and a rectifier interposed between said indicator and said balanced modulator.

5. Apparatus as described in claim 2 wherein said first and second transducers comprise first and second balanced modulators, respectively, and said first and second impedance adjusting means comprise, respectively, a first and second reversible two phase motor, and having a rectifier interposed between said indicator and said balanced modulators.

6. In a transfer system wherein a predetermined condition of operation is a function of at least two variables, the method of achieving and maintaining said condition at an optimum value comprising the steps of continuously and incrementally changing the value of a first of said variables above and below a mean value thereof in accordance with a first predetermined law of periodic variation, continuously and incrementally changing the value of a second of said variables above and below a mean value thereof in accordance with a second and different predetermined law of variation, continually producing a first quantity which is selectively responsive to changes produced in said condition of operation in accordance with said first law of periodic variation, adjusting the mean value of said first variable in accordance with a relationship of the instantaneous incremental change in said first variable to said first quantity, continually producing a second quantity which is selectively responsive to changes produced in said condition of operation in accordance with said second law of periodic variation, and adjusting the mean value of said second variable in accordance with a relationship of the instantaneous incremental change in said second variable to said second quatity.

7. In a transfer system wherein a predetermined condition of operation is a function of at least two variables, the method of maintaining automatically said condition at an optimum value comprising the steps of alternately and incrementally increasing and decreasing the value of a first of said variables with respect to the mean value thereof, alternately and incrementally increasing and decreasing value of a second of said variables with respect to the mean value thereof, continually and selectively measuring the sign of the partial derivative of the value of said condition of operation with respect to the value of said first variable, adjusting the mean value of said first variable in accordance with the sign of said derivative in the direction of optimum value, continually and selectively measuring the sign of the partial derivative of the value of said second variable with respect to the incremental change in condition of operation produced thereby, and adjusting the mean value of said second variable in accordance with the sign of said last said derivative in the direction of optimum value.

8. In a system for the transfer of electrical energy from a source to a load, the automatic method of adjusting the system for a predetermined optimum condition of power transfer comprising the steps of cyclically varying the reactance of a first electrical network to which said condition of power transfer is responsive, cyclically varying the reactance of a second electrical network to which said condition of power transfer is responsive, said cyclic variations of the reactance of said second network bearing a different relationship with respect to time than said first said cyclic variations, selectively measuring incremental variations in said condition of power transfer produced by the changes in reactance in said first and second networks, respectively, and idividually adjusting the mean reactances of said first and second networks, respectively, and individually adjusting the spective instantaneous incremental impedance change with respect to the instantaneous variation in said condition of power transfer produced thereby.

9. In a system for the transfer of radio frequency energy from a source to a load, the method of adjusting automatically the system for a predetermined optimum condition of power transfer comprising the steps of alternately and periodically increasing and decreasing incrementally the reactance of a first electrical network to which said condition is responsive above and below the mean value thereof, alternately and periodically increasing and decreasing the reactance of a second electrical network to which the condition of power transfer is responsive above and below the mean value thereof, synchronizing said reactance changes so that said incremental changes in said networks occur during alternate intervals of time, continually measuring the variations in said condition produced by the changes in said first and second networks, selectively controlling the adjustment of the mean reactance value of said first network in accordance with the variations in said condition caused by said incremental increase and decrease in the reactance of said first network, and selectively controlling the adjustment of the mean reactance value of said second network in accordance with the variations in said condition caused by said incremental increase and decrease in the reactance of said second network, the changes in the mean values of said first and second networks produced by said last-said adjustments being at a rate substantially lower than the rate of change produced therein by the above said incremental changes in value.

10. In a system for the transfer of electrical energy from a source to a load, the automatic method of adjusting the system for a predetermined optimum condition of power transfer comprising the steps of continually varying in accordance with the sine function of a rotating reference vector the reactance of a first network to which said condition is responsive, continually varying in accordance with the cosine function of said vector the reactance of a second network to which said condition is responsive, continually and selectively measuring the sine and cosine components of the variations in said condition produced by the corresponding reactance changes in said first and second networks, and selectively controlling the adjustment of said first and second networks in accordance with the respective sine and cosine variations in said condition to achieve and maintain said optimum power transfer.

11. In a system for the transfer of electrical energy from a source to a load, the method of adjusting automatically the system for a predetermined optimum condition of power transfer comprising the steps of continuously and incrementally varying at a first predetermined periodic rate the reactance of a first network to which said condition is responsive, continuously varying at a second and different predetermined periodic rate the reactance of a second network to which said condition of power transfer is responsive, producing a first electrical signal varying in accordance with variations in said condition produced by said changes in reactance in said first and second networks, filtering said first signal to produce a second signal selectively responsive to changes occurring at said first periodic rate and a third signal selectively responsive to changes occurring at said second periodic rate, and adjusting the mean reactance values of said first and second networks in accordance with the values of said second and third signals, respectively, to achieve and maintain said optimum power transfer.

12. In a system for the transfer of electrical energy from a source along a transmission line to a load, the method of adjusting automatically the system for a predetermined optimum condition of power transfer comprising the steps of continually varying the reactance of a first network to which said condition of power transfer is responsive, continually varying the reactance of a second network to which said condition is responsive, selectively measuring the variations produced in the reflected waves on said transmission line by said incremental reactance variations in said first and second networks, respectively; and individually controlling the mean adjustment of said first and second networks in accordance with the respective variations in said reflected waves to achieve and maintain said optimum power transfer.

13. In a transfer system subject to external variations in conditions of transfer, apparatus for maintaining a predetermined condition of operation, comprising, compensating means having at least two separate adjustments for varying said condition of operation to compensate for said external variations, means effecting incremental, continual, and individual variation of said adjustments with different and predetermined time relationships and producing corresponding changes in said condition of operation, means responsive to changes in said condition of operation and including means for separating effects produced by said changes in accordance with said time relationships, and means separate from said incremental variation means for adjusting said compensating means in accordance with said respective separated effects to maintain automatically said predetermined operating conditions.

14. In a transfer system subject to external variations in conditions of transfer, apparatus for maintaining a predetermined condition of operation, comprising compensating means having a first and a second independently adjustable element for compensating said external variations, means effecting incremental, continual, and individual variation of said elements in accordance with a first and a second periodic law of variation, means responsive to changes in said condition of operation and including means for separating first and second effects produced by said changes in accordance with said first and second laws of variation, respectively; and means for individually adjusting said first and second elements in accordance with said first and second effects respectively.

15. In a system for transferring electrical energy from a source along a transmission line to a load wherein the transfer of power is subject to variations caused by changes in generator, line or load conditions and is a function of at least two variables of a tuning device, apparatus for adjusting automatically said tuning device for a predetermined optimum condition of power transfer, comprising means for varying incrementally and continually the impedance value of a first branch of said tuning device to thereby effect continual small changes in the transfer of power, means for varying incrementally and continually in predetermined time relationship to said first means the impedance value of a second branch of said tuning device to thereby effect continual small changes in the transfer of power, measuring means coupled to said transmission line responsive to the transfer of power therealong, a first transducer means coupled to the output of said measuring means and responsive selectively to variations therein produced by impedance variations of said first branch, means coupled to the output of said first transducer means responsive to the phase relationship between the incremental impedance variations of said first branch and the variations produced thereby in the transfer of power for adjusting the mean impedance value of said first branch, a second transducer means coupled to the output of said measuring means and responsive selectively to variations therein produced by impedance variations in said second branch, and means coupled to the output of said second transducer means responsive to the phase relationship between the incremental impedance variations of said second branch and the variations produced thereby in the transfer of power for adjusting the mean impedance value of said second branch.

16. In a system for the transfer of energy along a transmission line from a source to a load, apparatus for compensating automatically for variations in the parameters of the system effecting the transfer of energy from the transmission line to the load, said apparatus comprising an impedance matching network coupled to said system and having at least two adjustable impedance elements for varying the impedance relationships between said load, said transmission line, and said source and varying, therefore, the condition of power transfer, impedance varying means cyclically changing the impedance value of said first and second elements, respectively, over a small proportion of their respective total impedance ranges, the law of cyclic variation being different for each impedance element, an indicator device coupled to said system and providing an output voltage having an extreme value under a predetermined condition of power transfer; a first transducer coupled to the output of said indicator device and operating in accordance with the law of cyclic variation of said first impedance element and responsive selectively to the cyclic variations in the output voltage of said indicator device caused by said cyclic variations of said first impedance element, a second transducer coupled to the output of said indicator device and operating in accordance with the law of cyclic variation of said second impedance element and responsive selectively to the cyclic variations in the output voltage of said indicator device caused by said cyclic variations of said second impedance element, a first and a second impedance adjusting means coupled to the outputs of said first and second transducer, respectively, and adjusting, respectively, the mean values of said impedance elements to maintain automatically said predetermined condition of power transfer.

CARL G. SONTHEIMER.

REFERENCES CITED

The following references are of record in the file of this patent:

UNITED STATES PATENTS

| Number | Name | Date |
| --- | --- | --- |
| 2,203,472 | Schmidt | June 4, 1940 |
| 2,262,573 | Bender | Nov. 11, 1941 |
| 2,376,667 | Cunningham | May 22, 1945 |
| 2,415,799 | Reifel et al. | Feb. 11, 1947 |
| 2,470,443 | Mittlemann | May 17, 1949 |
| 2,499,182 | Dyson | Feb. 28, 1950 |
| 2,508,321 | Wilmotte | May 16, 1950 |